United States Patent Office 2,940,532
Patented June 14, 1960

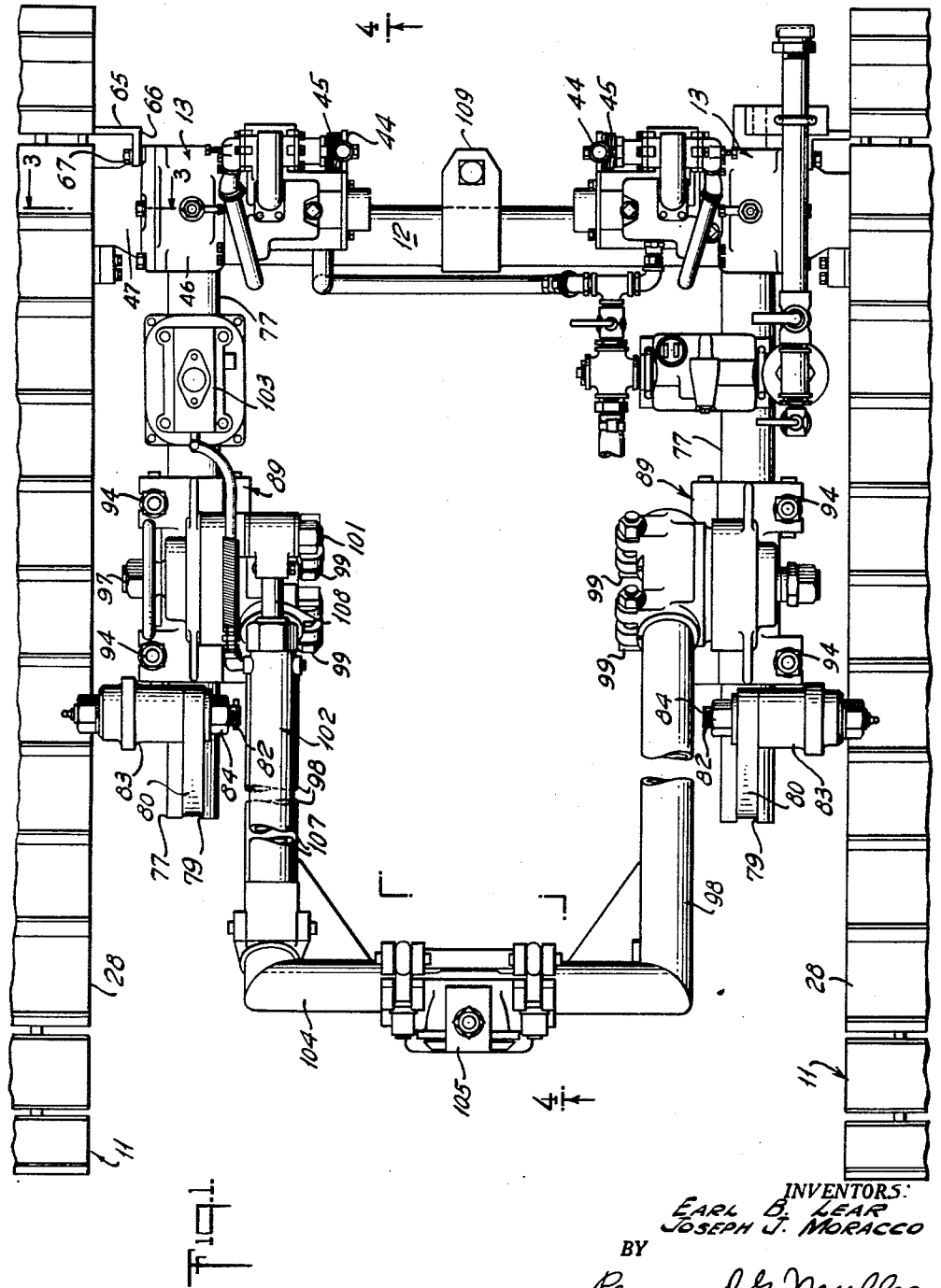

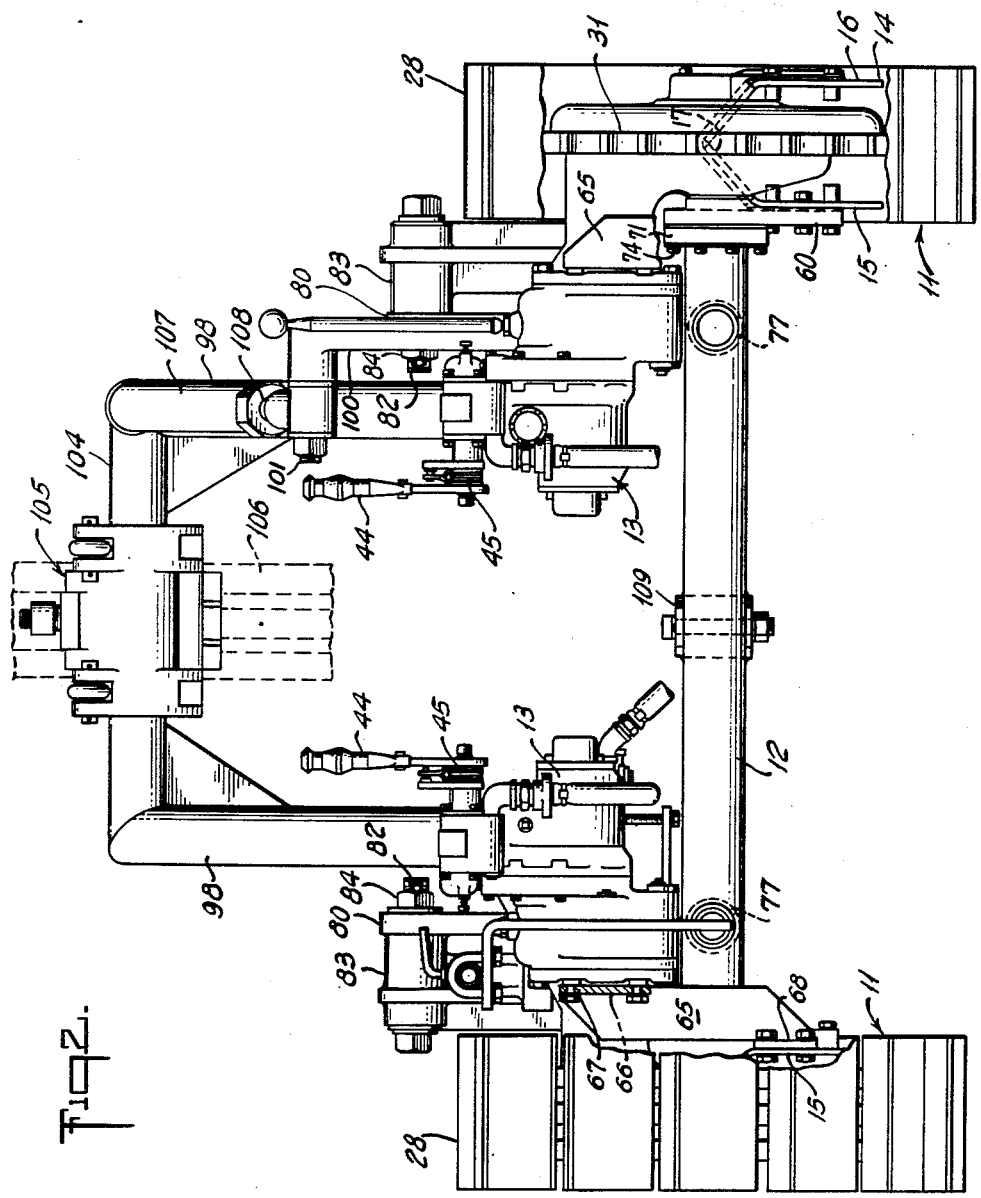

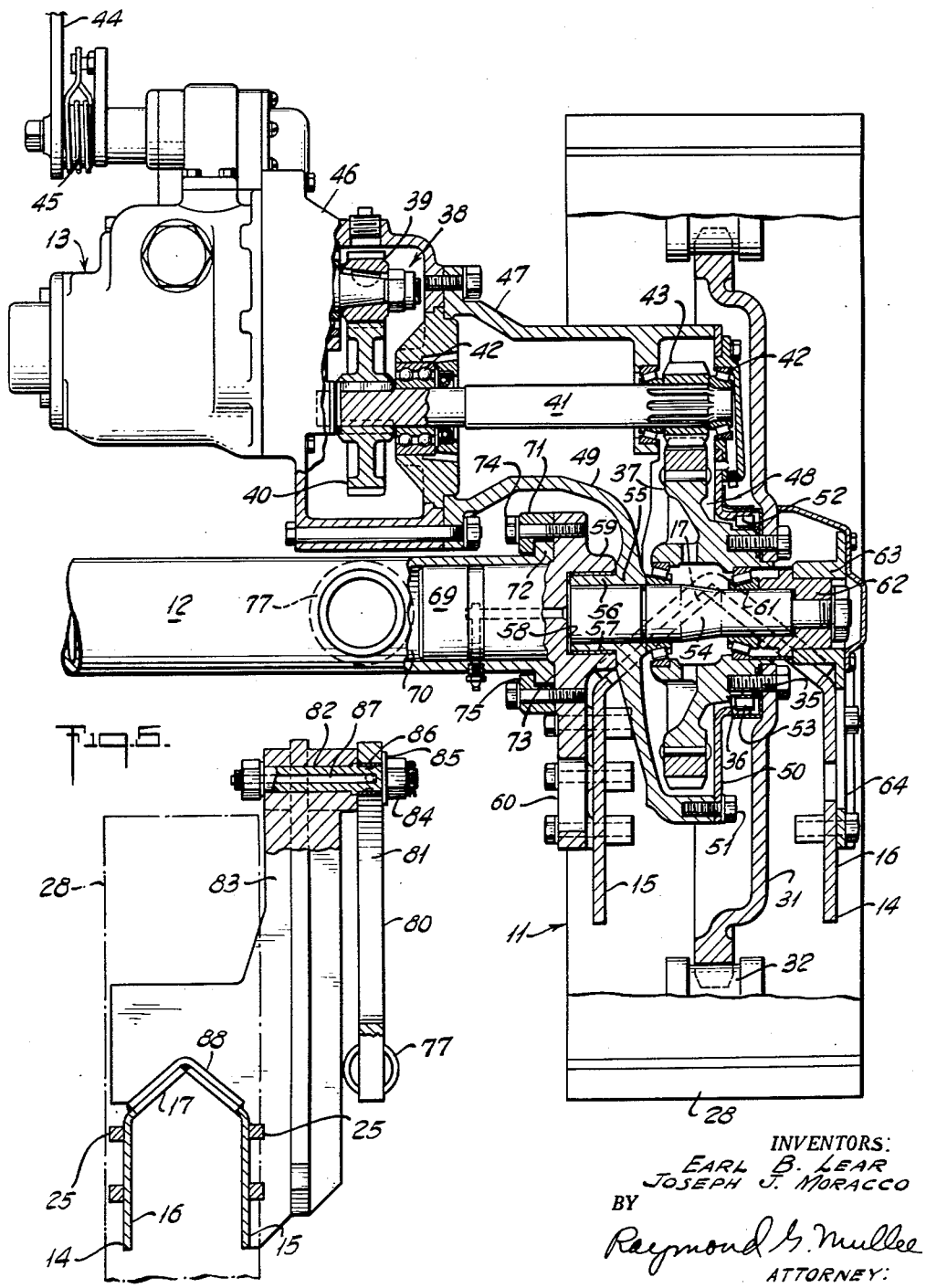

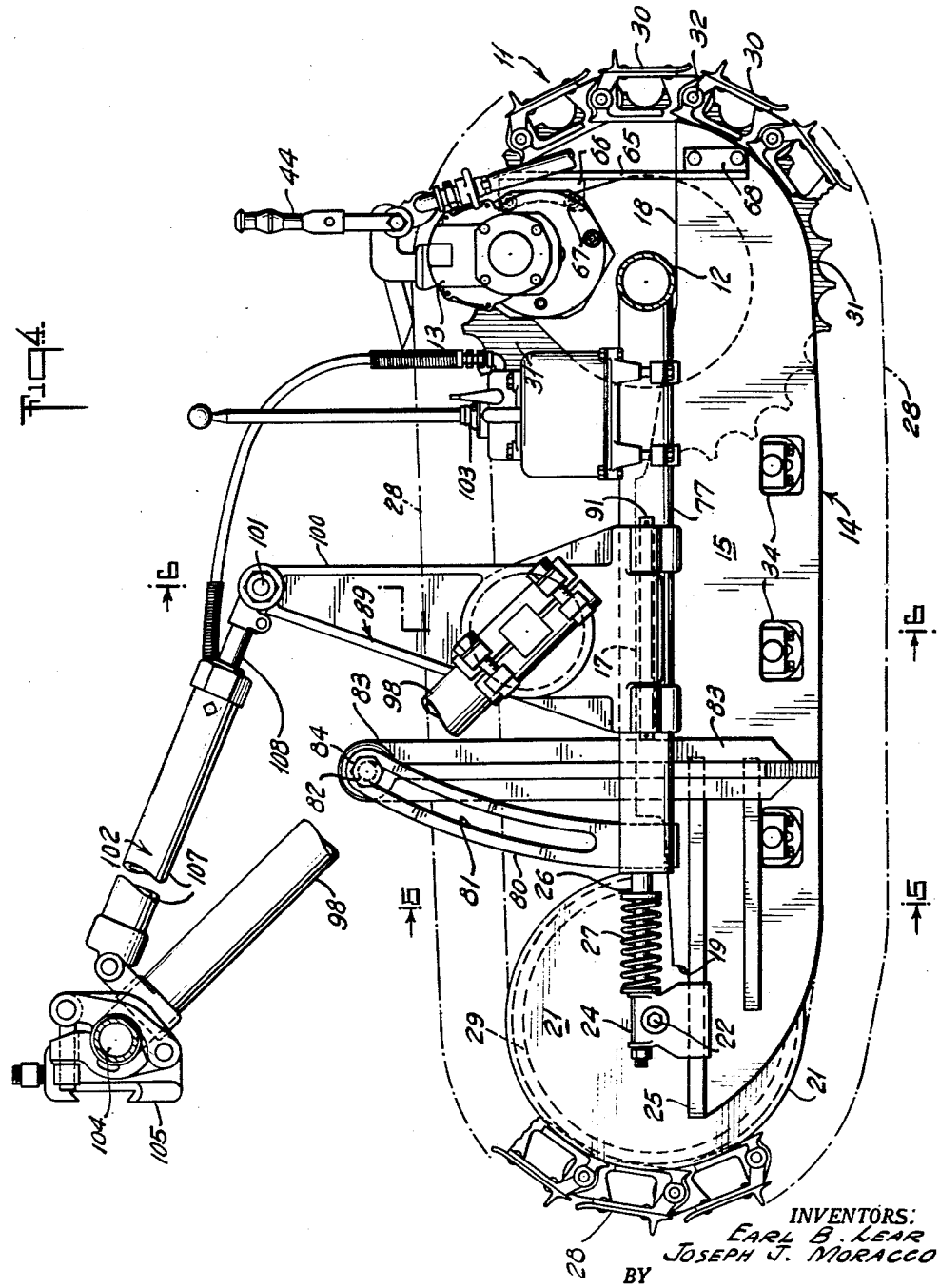

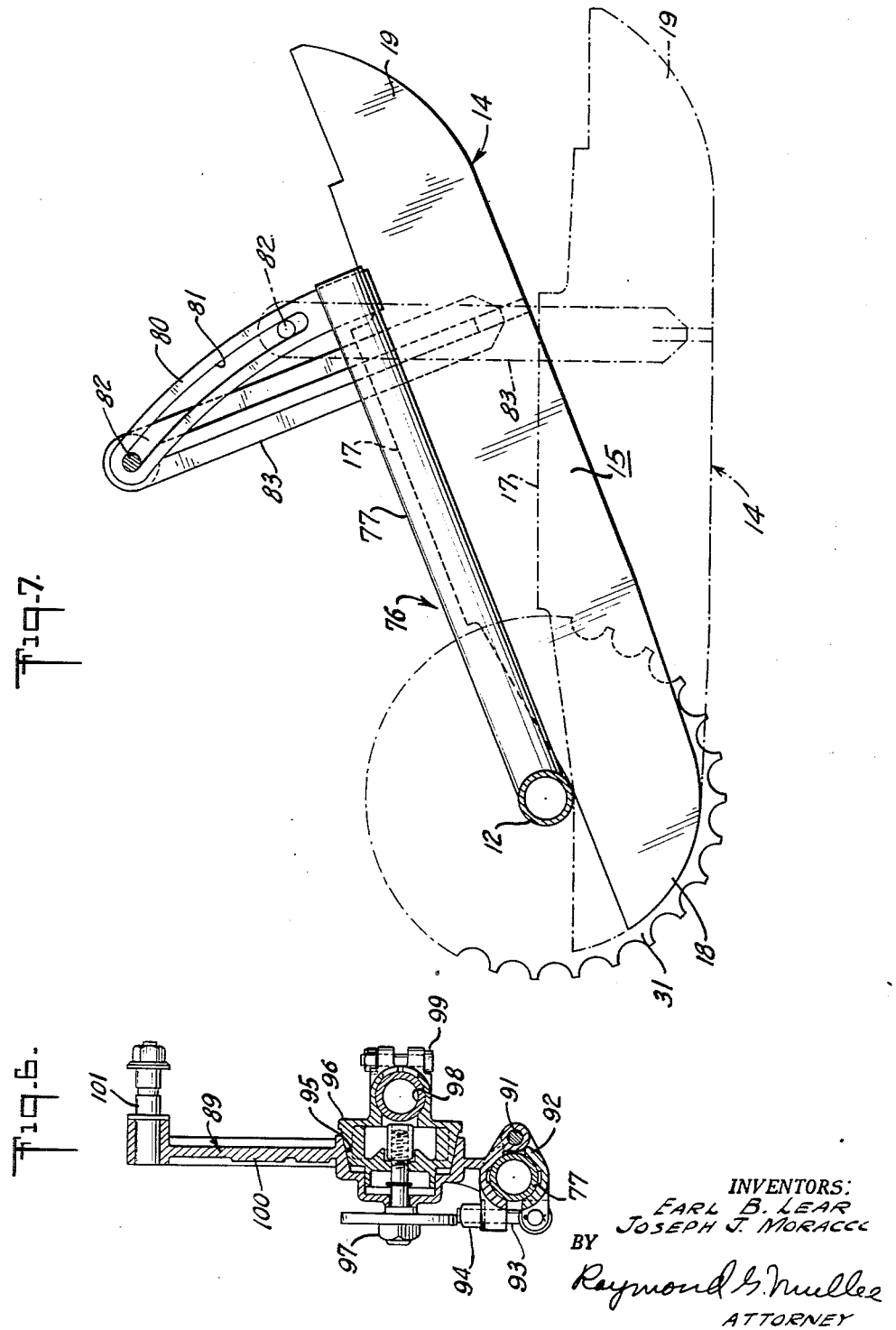

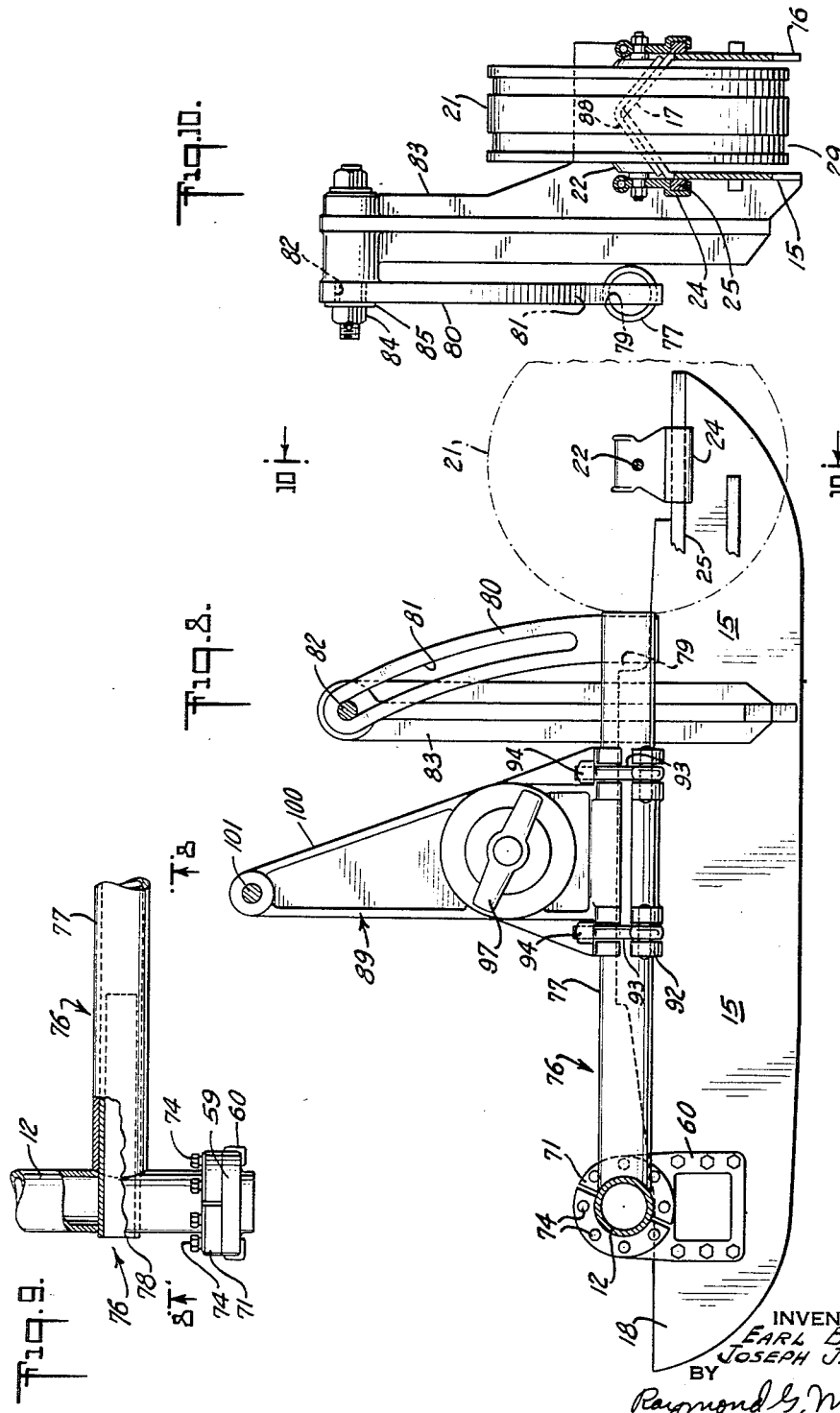

2,940,532
INDEPENDENTLY POWERED ENDLESS TREADS WITH KNEE ACTION FOR DRILL SUPPORTING TRACTOR

Earl B. Lear and Joseph J. Moracco, Utica, N.Y., assignors to Chicago Pneumatic Tool Company, New York, N.Y., a corporation of New Jersey Filed Apr. 4, 1956, Ser. No. 576,149

10 Claims. (Cl. 180—6.48)

This invention pertains to new and useful improvements in endless track vehicles. More particularly, it is concerned with a self-propelled vehicle having track members operating with a knee action. While the invention is subject to a wide variety of applications, it finds particular use as a supporting vehicle for heavy machinery, such as a rock drill.

A feature of the invention is certain structure therein which gives to each of the track units of the vehicle the advantages of independent knee action movement. This enables the vehicle to travel smoothly over uneven and rocky surfaces without turning over, and further enables a positive footing on such surfaces for work operations of the tools carried on the vehicle.

Another feature of the invention is an arrangement of parts therein, whereby a tool supporting frame carried upon the vehicle retains a stable position despite great unevenness of the terrain on which the vehicle may be resting or moving.

A further feature of the invention is the provision of separately controlled drives for each track unit, whereby either track may be driven independently of the other. This arrangement enables side movements of the vehicle as well as forward, rearward and angular movements thereof. Because of these characteristics, it is possible for the vehicle to easily travel over rocky terrain, to push aside large rocks, level small hills, and provide a sure footing for the vehicle and for the work machinery mounted thereon.

A general object of this invention is, therefore, to provide a novel and improved type of endless track vehicles having knee action motion in each track unit.

Another object of this invention is to provide an endless track vehicle having track units which are movable forwardly and rearwardly, and are pivotable in a vertical as well as in a horizontal plane.

A further object of this invention is to provide a rock drill supporting vehicle which is self-propelled, requires a minimum of manpower, is a carrier for a rock drill slide, is very flexible and maneuverable, is able to traverse uneven and rocky terrain with a minimum of effort and is able to tow a heavy load as it does so.

The invention further lies in the particular construction and general organization of its various component parts as well as in their cooperative association with one another to effect the results and advantages intended herein.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a top plan view of an endless track vehicle embodying the invention;

Fig. 2 is a rear end view thereof;

Fig. 3 is a sectional detail taken on the line 3—3 of Fig. 1 showing the sprocket drive and its association with cross tie-bar;

Fig. 4 is a longitudinal section on line 4—4 of Fig. 1 to show the right track unit;

Fig. 5 is a section on the line 5—5 of Fig. 4;

Fig. 6 is a section taken on the line 6—6 in Fig. 4 showing one of the connections between the framing assembly and the U-bar pivotally supported thereby;

Fig. 7 is a diagrammatic view looking in the opposite direction from that of Fig. 4, showing in full lines one track unit in elevated condition and, in broken lines, the other track unit in horizontal position, together with parts of the framing assembly which is also elevated;

Fig. 8 is a view looking in the same direction as Fig. 7 and as indicated by arrows 8 in Fig. 9, showing parts of the framing assembly and main supporting frame;

Fig. 9 is a plan view, partly in section, showing a part of the framing and its connection to the cross-tie bar; and Fig. 10 is a section taken on the line 10—10 in Fig. 8, showing the idler wheel and parts of the main frame and framing assembly.

In describing the invention in further detail, reference is now directed to the several drawings wherein like parts are designated by the same reference number. In the drawings is disclosed a tractor vehicle having a pair of endless track units 11 disposed in spaced parallel relation to each other. The track units are connected together at the rear by a cross-tie bar 12. The latter is pivotally connected at its ends to each track unit, whereby each track unit can pivot independently of the other in a vertical plane about its particular end of the tie-bar. The structural arrangement is such that each track unit is capable of knee action performance, the nature of which will further appear as this description proceeds. A separate motor 13 is provided to separately drive each track unit independently of the other.

A track unit comprises a longitudinally disposed main supporting frame 14 having an elongated inner frame plate 15 disposed in spaced parallel relation to a similar outer frame plate 16. These are bridged together in their top mid-areas by a short peaked formation 17. This form of the members of the frame provides a fork 18 at the rear, and a fork 19 at the front. An idler wheel 21 is rotatably mounted in the front fork upon a stub shaft 22 (Fig. 4). The latter is mounted at its ends across the frame plates in a pair of suitable supports 24. These are mounted for slidable movement along bar tracks 25 fixed along the outside of the frame plates 15 and 16. The forward positions of supports 24 are adjustable, and are controlled by rods 26 slidably carried at the front end by the supports and fixed at the rear end to the peaked framing 17. The effects of bumping of the idler wheel are transmitted to the slide supports, and are cushioned by buffer springs 27 carried on rods 26. The idler wheel supports the forward end of a conventional endless track 28, and provides a peripheral groove 29 in which the track rides as is it moved over the idler wheel. The track is formed of the usual hinged sections 30 connected by hinge elements, as at 32, which form a train of teeth along the underside of the track.

A sprocket wheel 31 mounted in the rear fork 18 of the framing drivably engages the train of teeth of the track in conventional manner, and serves to drive the track about the idler wheel.

The endless track 28 is further supported in its central lower area by a sufficient number of relatively smaller idler wheels 34 rotatably mounted between the frame plates.

Referring to Fig. 3, the sprocket wheel 31 is mounted fast by means of studs 35 to the hub 36 of a driven gear 37. The latter is driven by a reduction gear train, generally designated 38, which is drivingly engaged with an air driven motor 13. Motor 13 includes a conventional forward and reverse operating air driven rotor, not shown, which drives through pinion gears 39, 40, a drive shaft 41. The latter is journalled in bearings 42, and carries at its outer end a pinion gear 43 which drivingly engages gear 37.

A manually operable control lever 44 is associated with each motor unit 13. It is movable in a forward direction from a neutral position for forward movement of the related track unit, and in a backward direction for reverse travel. Operation of the lever in one direction or the other opens certain passages in a conventional control valve, not shown, for admitting pressurized air to drive the motor, which in turn drives the associated gear train and sprocket wheel. The further the control lever is moved from neutral position, the greater will be the air flow to the motor and consequent speed of the related track unit. The control lever is of the deadman type, having a spring load 45 to restore it to inoperative neutral position when manually released.

The motor is supported in a housing 46 to one end of which is bolted a housing extension 47. The latter enlarges downwardly at its outer end to provide a shallow end chamber 48. The upper area of this chamber accommodates the pinion gear 43; the lower area accommodates gear 37. This enlargement of the housing provides a depending plate 49 which forms the main wall of chamber 48. An end plate 50, bolted about its marginal edge at 51 to the end wall of housing extension 47, covers over the outer end of chamber 48 as a protection against the entrance of dirt. This cover plate has an axial hub opening, the wall 52 of which freely surrounds the hub 36 of the gear. Oil seal elements 53 are interposed between the hub of the rotatable gear and the inner wall of the hub of the cover plate.

A spindle or stub shaft 54 is mounted fast at its inner end in an axial hub formation 55 provided by the depending plate 49 of the extended motor housing. Hub 55, in turn, provides an inwardly projecting trunnion portion 56. The latter is journalled in a bushing 57 fitted in a socket 58 of a retaining bracket 59. The latter has a depending mounting plate 60 which is bolted fast to the outer face of the rear portion of the inner frame plate 15. Stub shaft 54 is fitted in its central area in the inner races of bearings 61. On the outer races of the latter the gear 37 is supported for rotation. A trunnion element 62 bolted fast on the outer end of the stub shaft is journalled in a retaining bracket 63. The latter has a depending mounting plate 64 which is bolted fast to the outer face of the outer frame plate 16.

There might be a slight tendency at times of the motor system 13 to roll on pinion 43 about the gear 37. This tendency of the motor system is restained by an upright torsion bar member 65 connecting the motor housing 46 with the main frame 14 of the related track unit (Figs. 1, 2 and 4). A mounting plate 66 at the upper end of the torsion bar is bolted fast to a rear portion of the motor housing at 67; and a mounting plate 68 at the lower end of the torsion bar is fixed to the inner frame plate 15 of the associated track unit, a little to the rear of bracket member 59 as appears in Fig. 4. The torsion bar restrains the tendency of the motor system to roll on the ring gear. The torsion bar also serves to lend support to the weight of the motor system, as well as to give to it advantages of floating characteristics whereby the shock and vibration effects of the movements of the vehicle upon the motor system are cushioned.

Referring to Fig. 3, a lateral and inward extension of the inner retaining bracket member 59 forms a trunnion 69 which is axially aligned with trunnion elements 56 and 62, and with stub shaft 54. Trunnion 69 is received for pivot action in a complementary cylindrical recess 70 formed in an end of the tie-bar 12. The latter bar is retained by a collar 71 for pivotal movement about trunnion 69. To this end, a peripheral flange 72 terminating an end of the tie-bar bears against a relatively larger peripheral flange 73 at the adjacent end of trunnion member 69. The collar member is bolted fast at 74 to trunnion flange 73, and provides an annular recess in which the terminating flange 72 of the tie-bar is received. A radially inwardly extending flange 75 of the collar encircles the tie-bar in close proximity to the latter and close to the adjacent face of flange 72 whereby the tie-bar is restrained from pulling free of trunnion 69. A close tolerance exists between the walls of the collar member and the opposing faces of the tie-bar, whereby the tie-bar and trunnion member 69 are free to rotate relative to one another.

The tie-bar is similarly associated at its opposite end with the other track unit of the vehicle. By this arrangement, it is plain that the tie-bar is free to pivot about the trunnions 69 of the track units, and each track unit is free to pivot about its particular end of the tie-bar, independently of any pivoting movement of the other track unit. These characteristics will, it is plain, provide various advantages of positioning and locomotion of the vehicle on rough and rock terrain, not otherwise possible without tipping the vehicle.

The load supported by the vehicle is carried upon a framing assembly 76 which includes the cross-tie bar 12 and a pair of tubular arms 77, each extending forwardly therefrom and in closely spaced relation to one of the track units 11. Referring to Figs. 8 and 9, the rear end of each tubular arm abuts against the tie-bar 12 and is rigidly joined to the latter by a sleeve 78 having a tight fit with both the tie bar and the tubular arm 77. The front end of each arm is provided with a slot 79 (Fig. 10) to receive an upright segment 80, which is rigidly secured to the arm, as by welding. Each segment is provided with an elongated slot 81 concentric with the pivotal axis of the cross-tie bar 12. As seen in Figs. 4, 5, 8 and 10, the upper end of one or both of the arcuate slots 81 rests upon a horizontal supporting pin 82 carried by an upright supporting post 83. An arrangement of nuts 84 and washers 85 holds the pin 82 in assembled relation to the post 83 and the segment 80 which abuts against the post. A bushing 86, surrounding the projecting end of the pin, provides an anti-friction and wear resistant means or roller element for guiding the pin in its movement along the arcuate slot 81. The inner end of the bushing is connected to an oil passage 87 as seen in Fig. 5. The lower end of each post 83 rests against the inner frame plate 15, in welded relation thereto, while an intermediate portion of the post carries a pair of flanges 88 of inverted V-shape which rest upon the peaked formation 17 of the main supporting frame, the flanges being welded thereto, whereby the post 83 forms a substantially integral structure with the main supporting frame 14.

Referring particularly to Figs. 6 and 8, a U-bar supporting bracket 89 is provided with a concave portion at its underside seated upon the tubular arm 77. The inner side of the bracket near the lower end carries a hinge pin 91 which pivotally supports a bracket clamp 92 shaped to fit the bottom of the tubular arm. A pair of eye bolts 93 pivotally supported on the outside of the clamp, extend between lugs on the bracket and cooperate with nuts 94 to hold the parts 77, 89 and 92 rigidly secured together in the selected position of adjustment on the arm. There are two brackets so supported and they have horizontal, axially aligned, conical recesses 95, each cooperating with a complementary shaped portion on a U-bar swivel 96. A wing bolt 97 is arranged to draw the U-bar swivel 96 toward the supporting bracket 89 and lock these two parts against relative movement due to the frictional engagement between the two conical surfaces. The wing bolt may be loosened to unlock the U-bar swivel for rotation about the axis of the conical recess 95 when that is desired. Extending inwardly from its conical portion, the U-bar swivel 96 is provided with a cylindrical opening to receive the associated arm of a drill-supporting U-bar 98. Inwardly of the U-bar arm 98, the swivel 96 is split and apertured to receive a bolt 99 which tightly clamps the swivel around the U-bar arm. The two brackets 89 are identical at their lower ends which serves as means for mounting the U-bar upon the tubular arms 77 but only one of the brackets has an upward extension 100 terminating in a stud 101.

The brackets 89 by which the U-bar 98 is mounted to the tubular arms 77 of the framing assembly, are formed to permit angular adjustment as desired of the U-bar, as well as locking of the latter in its adjusted position. Angular adjustment of the U-bar on its brackets is obtained by a hydraulic jack system 102, the controls 103 of which are carried by one of the tubular arms 77. The U-bar has a cross portion 104 which is parallel to the tie-bar 12. It carries a conventional saddle 105 to which the conventional slide and rock drill 106 are supported. The hydraulic jack system comprises a cylinder 107 and piston and piston rod 108 connected to the upper arm of an arm 98 of the U-bar and stud 101 respectively.

Because of the load on its extended arms 77, the tie-bar 12 constantly tends to pivot and carry the latter together with the segments thereon in a downward direction. Pivoting of the tie-bar in one direction or the other is controlled by the pin elements 82 in cooperation with the post members 83. Each post 83 with its pin 82 is carried angularly up or down with the pivoted movement of its related track unit. In a leveled condition of the track units the upper end wall of the slot 81 of each segment 80 will rest upon its related pin 82, whereby the extended arms 77 and the load thereon will also be level (Figs. 4 and 8). Accordingly, it is plain that when both track units pivot angularly upward to the same degree, the segments will be angularly lifted by the posts to the same degree; and when the track units pivot downward to the same degree, the segments will, accordingly, follow the descent of the posts.

Since each track unit is pivotable on its trunnion member 69 independently of the other, one track unit may, accordingly, pivot higher or lower relative to the other. In this differential movement of the track units the segments, which move as one, will be lifted angularly as one by the post of that track unit which pivots to the higher degree; and they will follow as one that post which descends to the lesser degree.

Fig. 7 is a diagrammatic illustration of the vehicle in action. One track unit, shown in broken lines, is on a level surface, and the forward end only of the other, shown in full line, has been pivoted upward by a sloping under surface. In other words, both sprocket wheels 31 and one idler wheel 21 rest on level ground but the other idler wheel has been lifted by an obstruction. It is to be noted that both segments have been angularly lifted as a unit by the elevated post 83.

The track units 11 are limited in the extent to which they may pivot relative to one another by the height of the slots 81 in the segments. In Fig. 7 the track unit, which is shown in elevated position, has been pivoted almost to its highest degree relative to the other track unit. It is limited against much further upward pivoting by the engagement of the lower end wall of the slot 81 of the segment 80 of the other track unit with the other post. When one of the segments is lifted, as in Fig. 7, the other segment is caused to idly ride by means of its slot over its associated roller.

The knee action movement, or pivoting of one track unit relative to the other, is of decided advantage in travelling over rough terrain and in maintaining a constantly stabilized condition of the load carried on the extended arms of the vehicle. The vehicle has the further advantage of being able to position its track units on uneven surfaces and at the same time maintain a stabilized condition of the machinery carried by the vehicle.

It has been earlier mentioned that each track unit may be driven forwardly or rearwardly independently of the other unit. This is enabled by the separate motor drives associated with each track unit. By this arrangement, it can be seen that a faster or greater forward or reverse movement of one track unit relative to the other will result in a side movement of the vehicle. This side locomotion will be a pivoting action of the track units at the rear on the ground surface and a horizontal plane. By skilled manipulation of the hand control 44 of each motor, a side locomotion of the vehicle, as well as a vertical pivotal action can be obtained, as above, whereby large rocks, mounds of dirt and other obstructions can be pushed to one side to provide a level ground surface. Turning and other maneuvers over uneven surfaces can also be obtained by proper control of the relative speeds of the respective track units.

It is to be noted that the tie-bar is equipped with a tow-bar hitch 109, whereby a tender vehicle, not shown, may be towed.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is our intent, therefore, to claim the invention not only as shown and described, but also in all such forms and modifications thereof as may be reasonably construed to fall within the appended claims.

We claim:

1. In a rock drill mount a pair of independent and individually motorized elongated endless track units disposed in spaced parallel relation to one another and a cross-tie member detachably pivoted at its ends to the track units whereby the latter are pivotable independently of one another in a vertical plane about the ends of the cross-tie wherein each track unit is defined by arcuate forward and rear ends and the axis of curvature of the rear end is common to the pivot axes of the track unit and cross-tie, framing longitudinally disposed between the track units and connected at its rear to the cross-tie for pivoting together with the latter, laterally extending pin means carried by the forward end of each track unit, an upwardly disposed arm member neighboring each pin means and carried by the forward portion of the framing, and each arm member having an upwardly and rearwardly extending arcuate slot concentric with the cross-tie in which the related pin means is removably received for movement lengthwise of the slot, and the upper end walls of the slots normally resting upon their respective pin means whereby angular vertical movement of the framing is conditioned upon pivoting of the individual track units.

2. A rock drill mount of the character described including a cross tie and a pair of endless track units pivotable in a vertical plane independently of one another about opposite ends of the cross tie, wherein each track unit comprises a longitudinally disposed frame member; a trunnion element fixed at one end to a rear side portion of the frame member and pivotably engaged at the opposite end in an end of the cross tie; a sprocket wheel rotatably supported in the rear portion of the frame member; an idler wheel journalled in the forward portion of the frame member; an endless track drivably engaged by the sprocket wheel and trained about the idler wheel, the portion of the endless track engaged by the sprocket wheel defining a curved rear end to the track unit the axis of curvature of which is common to that of both the sprocket wheel and the cross-tie; a motor for driving the sprocket wheel; a gear train operatively engaging the sprocket wheel with the motor; a housing supporting the motor and gear train, and an upstanding flexible bar supporting the housing to the frame in elevated relation to the latter.

3. An endless track unit comprising a longitudinally disposed frame member; a sprocket wheel rotatably supported in the rear portion of the frame member; an idler wheel journalled in the forward portion of the frame member; a relatively wide endless track drivably engaged by the sprocket wheel and trained about the idler wheel; a motor for driving the sprocket wheel and, as a consequence, moving the endless track about the sprocket and idler wheels; a gear train operatively engaging the sprocket wheel with the motor; a bearing bracket fixed to a rear side of the frame member; a housing encasing the motor and the gear train, the housing having a horizontally disposed bearing sleeve extension pivoted in the said bearing bracket; a stub shaft carrying bearings rotatably supporting the sprocket wheel; a second bearing bracket fixed to the frame member in opposed relation to the first mentioned bearing bracket; the stub shaft being pivoted at one end in the second bearing bracket and being fixed at its opposite end in the said sleeve of the housing; and an upstanding torsion bar supporting the housing to the frame member in elevated relation to the latter whereby the motor, the housing, the bearing sleeve extension and the stub shaft are pivotable together with the frame member, and the torsion bar serving to yieldingly restrain angular movement of the housing and stub shaft relative to the frame member.

4. An endless track unit as defined in claim 3, wherein the first mentioned bearing bracket is characterized by a laterally extending trunnion piece; and wherein the track unit further comprises a load supporting structure pivoted at one end upon the trunnion and extending forwardly in close parallel relation to the frame member, an upright slotted member mounted to the forward end of the load supporting structure characterized by an arcuate slot having a center of curvature coaxial with the axes of the bearing brackets and the trunnion; and an upright post fixed at one end to a forward side of the frame member and having at its upper end a roller member engaging the slot for relative movement of the one over the other following pivotal movement of the frame member relative to the load supporting structure.

5. In a drill mount of the character described, a pair of endless track units disposed in spaced parallel relation to each other, each track unit individually comprising an elongated frame member, a stub cross shaft rotatably supported in the rear end of the frame member, a sprocket wheel rotatably mounted on the stub shaft, an idler wheel rotatably supported in the front end of the frame member, an endless track driveably engaged by the sprocket wheel and trained about the idler wheel, a motor, a gear train operatively engaging the sprocket wheel with the motor, a casing housing the motor and gear train and fixed to the stub shaft, an upstanding torsion bar supporting the casing to the frame member in elevated relation to the latter, and a trunnion element rigid with the frame member and extending laterally from the rear end thereof; and a cross tie between the track units arranged coaxially and swivelled at its ends upon the trunnion elements of the frame members of the track units, the torsion bar serving to yieldingly resist angular movement of the casing and stub shaft relative to the frame member.

6. In the structure defined in claim 5, framing fixed at its rear to the cross tie and having a pair of spaced arms extending forwardly between the track units; an upright slotted member fixed to the forward end of each arm and having a rearwardly curving arcuate slot substantially the height of the upright member and concentric with the cross tie; a pair of upright posts fixed, one to the forward end of each frame member and in close spaced relation to one of the upright slotted members; each post having a lateral pin freely received for riding in the slot of the neighboring upright slotted member, the slot of the latter having an upper wall normally resting upon the pin; and a U-bar mounted to the said arms adapted to support a rock drill.

7. A motorized endless track unit comprising an elongated frame member, a stub cross shaft rotatably supported in the rear end of the frame member, a sprocket wheel rotatably supported on the stub cross shaft, an idler wheel rotatably supported in the front end of the frame member, a broad endless track driveably engaged by the sprocket wheel and trained about the idler wheel, a motor, a gear train operatively engaging the sprocket wheel with the motor, a casing housing the motor and gear train and fixed to the stub cross shaft, and upstanding torsion bar means fixed at its lower end to the frame member and at its upper end to the casing, for cushioning shock and vibration effects of the movements of the track unit upon the motor.

8. An endless track vehicle knockdown assembly comprising a pair of independent motorized endless track units, each track unit having an individual motor unit, a gear train drivingly connecting the track unit to the motor unit, and a torsion bar fixed at one end to the track unit and carrying the motor unit at the other; a cross shaft independent of the track units; and means detachably mounting the track units to opposte ends of the shaft for pivotal movement in a vertical plane relative to the latter.

9. An endless track vehicle knockdown assembly comprising a pair of independent motorized endless track units, each including an elongated frame, an idler wheel rotatably supported in the forward end of the frame, a sprocket wheel rotatably supported in the rear end of the frame, a broad endless track trained about the sprocket and idler wheels and drivingly engaged by the sprocket wheel, the said entrainment of the endless track defining forward and rear curved ends to the track unit, the axis of curvature of the said rear end being common to that of the sprocket wheel, a motor unit, a gear train drive drivingly connnecting the sprocket wheel with the motor unit, and a torsion bar supporting the motor unit to the frame; a horizontal cross shaft having an axis of rotation common to that of the sprocket wheel of each track unit; and bearing means carried in part by the frames of the track units and in part by opposite ends of the cross shaft detachably connecting the track units to opposite ends of the cross shaft for pivotal movement relative to the latter in a vertical plane on an axis common to the axis of rotation of the cross shaft, and to the axis of curvature of the rear end of the track unit.

10. An endless track vehicle comprising a pair of elongated endless track units in lateral spaced parallel relation to each other characterized by forward and rear portions defining curved ends to the track units, each track unit having a sprocket wheel arranged in support of its rear portion and for driving the track unit independently of the other track unit, an individual motor for powering the sprocket wheel, and gear train drivingly connecting the sprocket wheel to the motor, and a torsion bar mounting the motor to the track unit, the axis of curvature of the rear portion of the track unit beng common to the axis of rotation of the sprocket wheel; and a transverse tie-bar having an axis of rotation axially aligned with the axes of rotation of the sprocket wheels and having a journaled arrangement at its ends with the track units so that the track units are swingable in a vertical plane about the axis of the tie bar and the tie bar is pivotable independently of either track unit and independently of rotation of either sprocket wheel.

(References on following page)

References Cited in the file of this patent

UNITED STATES PATENTS

| | | | |
|---|---|---|---|
| 1,842,752 | Hendrickson | Jan. 26, | 1932 |
| 1,903,380 | Talboys | Apr. 4, | 1933 |
| 2,044,878 | Curtis | June 23, | 1936 |
| 2,157,711 | Lamb | May 9, | 1939 |
| 2,265,986 | Allin | Dec. 16, | 1941 |
| 2,391,002 | Baker et al. | Dec. 18, | 1945 |
| 2,613,061 | Hurd | Oct. 7, | 1952 |
| 2,705,127 | Sellars | Mar. 29, | 1955 |
| 2,722,280 | Ballu | Nov. 1, | 1955 |
| 2,842,340 | Burress | July 8, | 1958 |

FOREIGN PATENTS

| | | | |
|---|---|---|---|
| 686,736 | Great Britain | Jan. 28, | 1953 |